United States Patent [19]

Wright

[11] Patent Number: 4,593,815
[45] Date of Patent: Jun. 10, 1986

[54] DEPLOYABLE COILED ROPE

[75] Inventor: David A. Wright, Fort Erie, Canada

[73] Assignee: Her Majesty the Queen in right of Canada, as represented by the Minister of National Defence, Ottawa, Canada

[21] Appl. No.: 703,528

[22] Filed: Feb. 20, 1985

[30] Foreign Application Priority Data

Apr. 5, 1984 [CA] Canada .................................. 451377

[51] Int. Cl.⁴ ............................................. B65D 85/04
[52] U.S. Cl. .................... 206/389; 206/410; 242/1; 242/159; 242/173
[58] Field of Search ............... 206/389, 410, 49, 409; 242/159, 171, 172, 173, 1, 174; 156/172

[56] References Cited

U.S. PATENT DOCUMENTS

| | | | |
|---|---|---|---|
| 2,436,402 | 2/1948 | Potter | 242/1 |
| 2,490,837 | 12/1949 | Scott, Jr. | 242/171 |
| 2,738,145 | 3/1956 | Taylor, Jr. | 242/173 |
| 2,964,262 | 12/1960 | Lessig et al. | 242/173 |
| 2,973,911 | 3/1961 | Rayburn | 242/159 |
| 3,044,614 | 7/1962 | Hanscom | 242/173 |
| 3,082,868 | 3/1963 | Hubbard | 242/1 |
| 3,089,588 | 5/1963 | Correll | 242/159 |
| 3,114,456 | 12/1963 | Van Billiard | 242/159 |
| 3,700,185 | 10/1972 | Hubbard et al. | 242/172 |

FOREIGN PATENT DOCUMENTS

0940342 10/1963 United Kingdom ................ 242/173

Primary Examiner—William Price
Assistant Examiner—Jimmy G. Foster
Attorney, Agent, or Firm—Stevens, Davis, Miller & Mosher

[57] ABSTRACT

A coiled rope providing a securely coiled rope structure which, when forcefully uncoiled, gives rapid yet controlled deployment of the rope, and a method of so coiling the rope. The rope is wound about a central core member in sequential, adjacent, planar circular layers of approximately similar diameter, each layer consisting of a plurality of coils of rope of increasing size commencing from the central core member. Adjacent coils of rope in each layer and adjacent layers of rope are releasably adhered to each other by contact cement so that the rope will remain securely coiled in storage or until required for use, and then permit rapid yet controlled uncoiling of the rope. Such a coiled rope is useful in providing controlled pay out of rope, for example, between life rafts being air dropped to survivors in the sea, the rope being payed out sequentially coil by coil and layer by layer.

12 Claims, 5 Drawing Figures

A
DEPLOYABLE COILED ROPE

The present invention relates to a coiled rope which remains securely coiled in storage and, when forcefully uncoiled, provides rapid yet controlled deployment of the rope, and to a method of so coiling the rope.

BACKGROUND OF THE INVENTION

There has been a need to provide deployment of rope from a rope coil in a manner in which the rope, as it becomes deployed, will not knot and will pay out in controlled, regular fashion without lumping. This need has been experienced, for example, in the air deployment of life rafts to survivors on a body of water, using a pair of deflated, inflatable life rafts, joined by a rope, and packaged in a rigid, hollow container as described in co-pending U.S. patent application Ser. No. 703,530 filed Feb. 20, 1985. Since the aerial deployment of such life rafts is carried out purely mechanically, without human involvement, and since that system of deployment of life rafts requires the distance between the life rafts to be as great as possible when the rafts land on the body of water, a method of storing of the rope in a small, easily packaged form, and method of ensuring regular, unobstructed, unknotted pay out of the rope during aerial deployment of such a system, have been sought. During aerial deployment of the rope-joined life rafts, the coils of a normally coiled rope tend to come apart in irregular fashion resulting in knotting of the rope between the rafts and irregular pay out. These effects reduce the ultimate spacing between the life rafts as they land on the surface of the water below. Moreover, the manner of coiling of the rope is important. A rope coiled in a ball (as for example a manually coiled ball of twine) leads to knotting and irregular pay out of the rope and the imparting of twisting torque to the ball of rope as it becomes uncoiled, tending to twist the rope itself and again lead to knotting. A spirally coiled rope (as for example fishing line on a reel) again produces problems. Here there is a tendency for the entire coil of rope to spin as the rope is being uncoiled, and for series of spirals in each layer to jump off, in irregular fashion, from the side of the coil, resulting in knotting, foul-ups and irregular pay outs.

Thus, it is an object of the present invention to provide a rope coil and method of coiling rope which will produce a coiled rope structure in which the rope will normally remain securely coiled and which, when that rope is forcefully uncoiled, will provide rapid yet controlled deployment of the rope while under that force. It is a further object of the invention to provide such a coiled rope structure which will permit unwinding of the rope without creating a significant degree of rotational movement to the rope structure during uncoiling.

SUMMARY OF THE INVENTION

According to the present invention there is provided a coiled rope which is wound starting from a first portion in sequential, adjacent, planar circular layers of approximately similar diameters to a second portion of the rope. Each layer consists of a plurality of coils of rope of increasing size commencing from a first coil. The adjacent layers form a coiled rope structure having flat ends. The adjacent coils of rope in each layer and adjacent layers of rope are releasably adhered to each other by contact cement so that the rope will remain normally securely coiled but when forcefully uncoiled will provide rapid yet controlled deployment of the rope. The rope when being unwound comes off from one of the flat sides, one layer at a time.

In a preferred embodiment, the rope passes from the external coil in each layer transversely across that layer to commence the first coil in the next adjacent layer.

Furthermore, according to the present invention there is provided a method of winding rope to produce a coiled rope structure. Firstly, a length of rope is coated with contact cement, and the contact cement is allowed to set so as to be dry to the touch. Then the rope is wound about a central core member in sequential, adjacent planar circular layers of approximately similar diameters in order that each layer consists of a plurality of coils of rope of increasing size commencing from the central core member.

The coiled rope according to the present invention is useful in situations where a controlled pay out of rope under force is required, and where the rope is to be maintained, under normal conditions, in securely coiled condition. The coiled rope structure according to the present invention provides pay out of rope, one layer at a time, from one side of the rope structure. Minimal torque or twisting forces are exerted by the uncoiling rope on the coiled rope structure. All of these features make the coiled rope according to the present invention ideal for use, for example, in the aerial deployment of roped joined life rafts in the apparatus and method described in the previously mentioned co-pending Canadian Patent Application.

BRIEF DESCRIPTION OF THE DRAWINGS

These and other objects and advantages of the present invention will become apparent upon reading the following detailed description and upon referring to the drawings in which.

Figure 1:
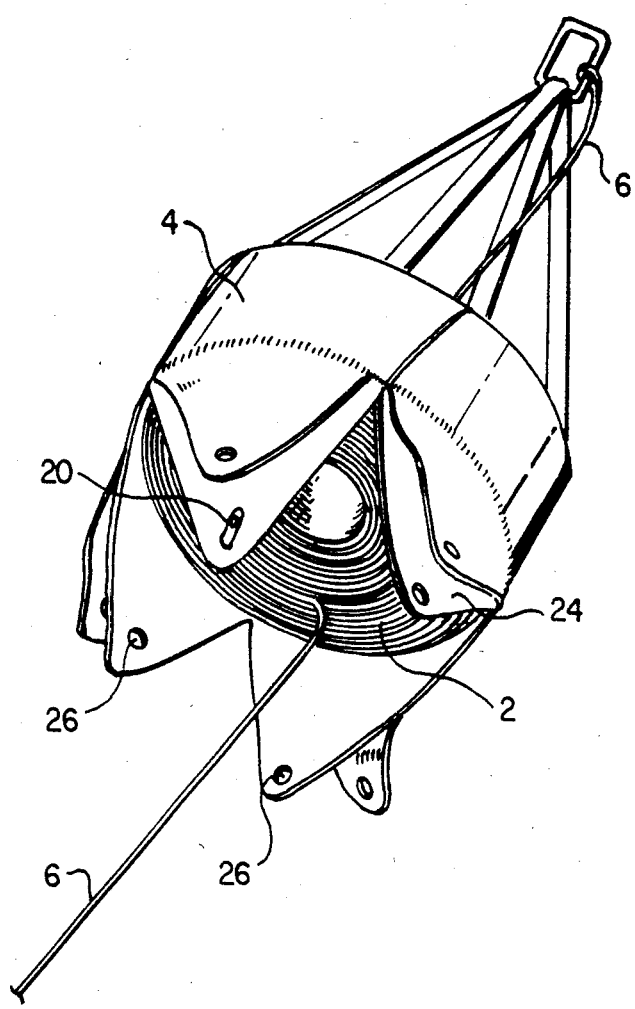
FIG. 1 is a perspective view of a coiled rope structure according to the present invention as a component of an air deployable life raft system in the process of rope pay-out.

While the invention will be described in association with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Turning to FIG. 1 there is shown a perspective view of a coiled rope structure 2 according to the present invention, contained in rope deployment package 4 which is used, for example, in the aerial deployment system for rope joined life rafts described in the aforementioned co-pending Patent Application. The rope 6 itself, may be made of any appropriate material such as polypropylene, the latter being preferred for the aforementioned application because of its strength and flotation ability.

Figure 2:
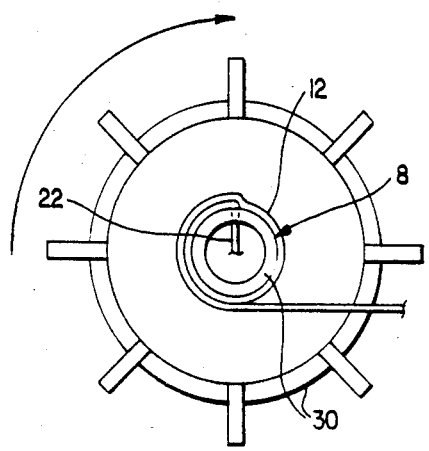
FIGS. 2 and 3 are schematic plan views from above of a jig on which a coiled rope structure according to the present invention is being wound.
Figure 3:
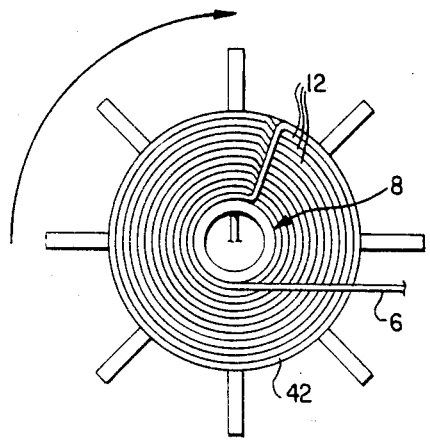
Figure 4:
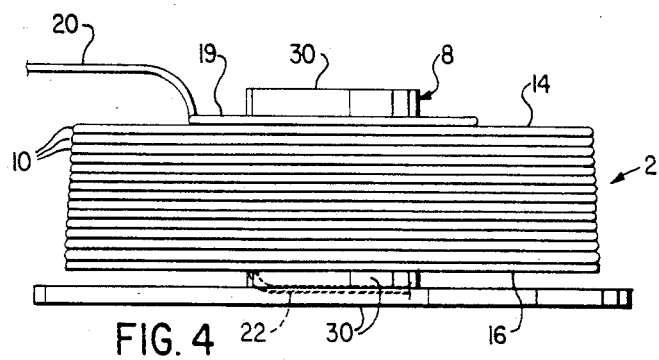
FIG. 4 is a side view of a coiled rope structure according to the present invention.

As can be seen in FIGS. 1 and 4, and as will be understood better from the following description of the method of coiling rope 6, coiled rope structure 2 is made by rope 6 being wound about a central core or tube 8, supported by removable jig 30, (FIGS. 2, 4), which tube may or may not be part of the final rope structure starting from a first rope portion, in sequential, adjacent, planar circular layers 10 (FIG. 4), each layer 10 consisting of a plurality of coils of rope, the coils increasing in size commencing from the central tube as can be seen from FIGS. 2 and 3. The final product, as illustrated in FIG. 4, is a coiled rope structure 2 having flat ends 14 and 16. The rope is able to maintain the structure 2 of FIG. 4 by adjacent coils 12 of rope in each layer 10 and adjacent layers 10 being releasably adhered to each other by means of contact cement 18 (FIG. 5), sufficient contact cement being used so that the rope will remain securely coiled and, when forcefully uncoiled, will provide rapid yet controlled deployment of the rope while under force. The outer end 20 (FIG. 4) of rope 6, from which coiled rope structure 2 would normally be uncoiled is preferably left glue free for a length such as, for example, about 38 feet as are the first 3 feet or so of the inner end 22 of rope 6. Rope 6 passes from a completed layer 10 to the inner coil 12 of the next adjacent layer by passing transversely across that layer to commence the first coil about the central tube 8 of the next adjacent layer 10, as can be seen in FIG. 3. It is preferred that the rope be coiled, from one layer to the next, in the same direction. As can be seen in FIG. 4, while most of the layers 10 have an outer coil 12 of the same or slightly diminishing diameter, the upper, outer coil 19, at flat end 14, from which the rope structure is designed to be uncoiled, may be of significantly less diameter.

It has been found appropriate, for purposes of the present invention, to use "Lepages Press Tite" (Trade Mark) Contact Cement. This cement can be handled without difficulty during coiling and, once positioned, remains secure until the rope is forcefully uncoiled during use. Other types or brands of contact cement may also be suitable and the type or brand of contact cement used is not believed to be critical at this stage of development of the invention. The contact cement holds the coil in a firm mass, when set, and prevents tangles during rapid deployment by maintaining a continuous but low resistance to line tension developed by the separating life raft packages, when used in association with the life raft deployment system of the aforementioned co-pending Patent Application.

The rope deployment package 4, where used in such application, is made of an appropriate fabric, and has flaps 24 with grommets 26 to enable the flaps to be releasably pinned on a post 28 extending from one of the flaps 24. Removal of the pin frees grommets 26 and flaps 24 from secured positioned on post 28.

Figure 5:
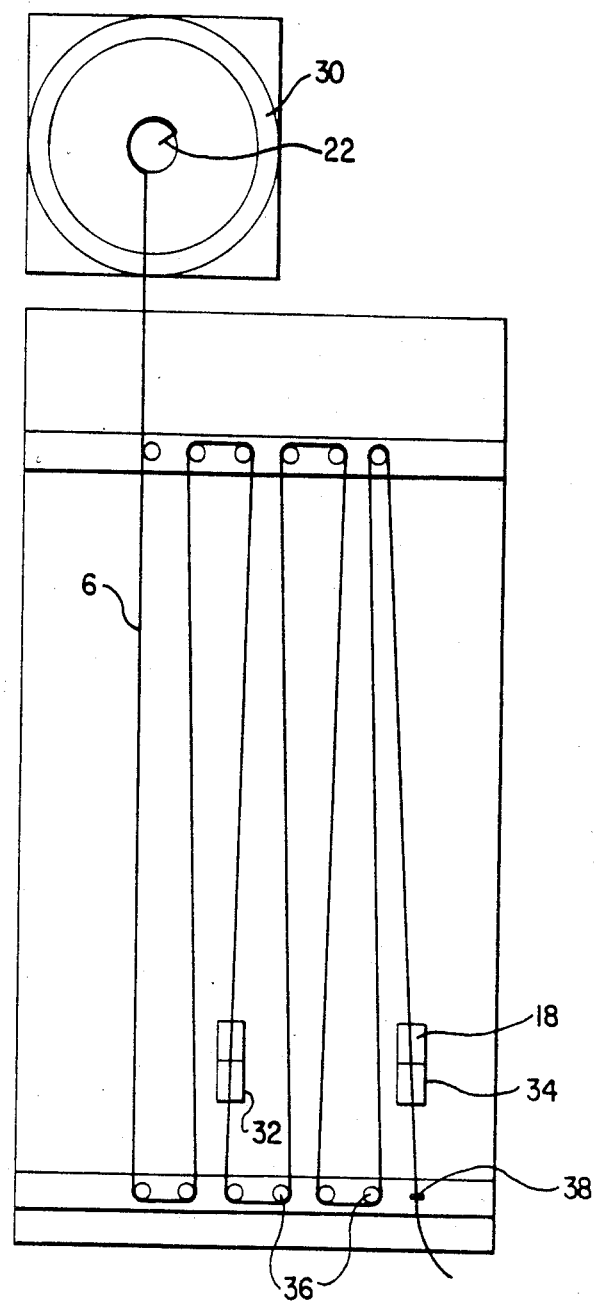
FIG. 5 is a schematic view of a production table for coiled rope structures according to the present invention.

In FIG. 5 there is illustrated a schematic view of a table layout for coiling a length of rope according to the present invention. End 22 of rope 6 is secured to tube 8 of rope coil jig 30 (FIGS. 1 and 5), this jig rotating, in the illustration, in a clockwise fashion at all times. Rope 6 is drawn through glue troughs 32 and 34, being directed by means of pulleys 36 and eye-bolt 38. As can be seen in FIG. 2, this apparatus permits winding of individual layers 10 having adjacent coils 12 in each layer formed with a larger diameter. When the outer coil 42 of the first layer 10 is reached, as shown for example in FIG. 3, rope 6 is crossed over, on top of this bottom coil 12 to central tube 8, where another layer 10 of coils 12 of increasing diameter is formed adjacent the first layer 10. As rope 6 has been coated with contact cement, adjacent coils 12 will adhere as will adjacent layers 10. In the illustrated embodiment, the inner coils 12 of each layer will additionally adhere to central tube 8, making central tube 8 an inherent part of coiled rope structure 2. (It will be understood however that if central tube is not desired, after the structure 2 has been formed, central tube 8 may be removed.) This process of coiling rope 6 into adjacent layers 10 is terminated when the coiled rope structure contains sufficient layers of coils, as shown in FIG. 4. It is desired, during this process, to vary the cross-over location of the rope as it goes from the outer coil 12 of one layer to the inner coil 12 of the next adjacent layer, to provide a more uniform appearance to coiled rope structure 2.

During the coiling process, there should be enough time from when rope 6 is pulled through the second glue trough 32 until it reaches the coil jig 30 for the glue to set. It is preferable that rope tension be not used when laying the coils to prevent upward bulging of layers 10.

It will be appreciated from FIGS. 1 and 4 that as coiled rope structure 2 is uncoiled, the uncoiling takes place from flat end 14, one layer 10 being uncoiled at a time, and, when completed, the uncoiling then extending to the next adjacent lower layer 10, the coils 12 of each layer being uncoiled sequentially from the largest outer coil towards the smallest inner coil. Again this sequence of uncoiling of layers 10 and coils 12 avoids tangling and permits rapid, controlled uncoiling from flat end 14 of coiled rope structure 2, with minimal torque or twisting force being exerted on the coiled rope structure 2.

Thus there has been provided in accordance with the invention a coiled rope, that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed:

1. A coiled rope, the rope being wound starting from a first position in sequential, adjacent, planar circular layers of approximately similar diameters, to a second outer portion of the rope forming a coiled rope structure having flat ends, each layer consisting of a plurality of coils of rope of increasing size commencing from a first coil, the rope passing from the external coil in each layer transversely across that layer to commence the first coil in the next adjacent layer, adjacent coils of rope in each layer and adjacent layers of rope being releasably adhered to each other by contact cement so that the rope will normally remain securely coiled, but when forcefully uncoiled, will provide rapid yet controlled deployment of the rope, the rope when being unwound coming off from one of the flat sides one layer at a time.

2. A coiled rope according to claim 1 wherein the direction of coiling of rope in each layer is the same.

3. A coiled rope according to claim 1 wherein the coil is between 300 and 900 feet in length.

4. A coiled rope according to claim 3 wherein about 36 inches of rope at the first portion and about 38 feet of rope at the second portion are left glue free.

5. A coiled rope according to claim 1 wherein the rope is also secured by contact cement to a central core member circumscribed by the first coil of each layer.

6. A coiled rope according to claim 1 wherein the contact cement is "Lepages Press Tite" (Trade Mark) Contact Cement used in a quantity of approximately 2.5 gallons per approximately 900 feet of rope.

7. A coiled rope according to claim 1 wherein the rope is made of polypropylene.

8. A coiled rope according to claim 1 wherein the last coiled layer of rope towards the second portion is of less diameter than the other layers.

9. A coiled rope contoured in a rope deployment package, the rope being wound starting from a first portion of sequential, adjacent, planar circular layers of approximately similar diameters, to a second outer portion of the rope each layer consisting of a plurality of coils of rope of increasing size commencing from a first coil, forming a coiled rope structure having flat ends, adjacent coils of rope in each layer and adjacent layers of rope being releasably adhered to each other by contact cement so that the rope will normally remain securely coiled, but when forcefully uncoiled, will provide rapid yet controlled deployment of the rope, the rope when being unwound coming off from one of the flat sides one layer at a time, the rope deployment package comprising a bag having releasably securable flaps which, when open, expose the end of the rope structure adjacent the second portion of the rope.

10. A method of winding rope to produce a coiled rope structure, which comprises the steps of:
   (a) coating a length of rope with contact cement and allowing the cement to set so as to be dry to the touch; and
   (b) winding that rope about a central core member in sequential, adjacent planar circular layers of approximately similar diameters so each layer consists of a plurality of coils of rope of increasing size commencing from the central core member, the external coil of rope from each layer being passed transversely across that layer to commence the first coil about the central tube of the next adjacent layer.

11. A method according to claim 10 wherein the layers are coiled in the same direction.

12. A method according to claim 10 wherein a portion of a length of rope is secured to a rotatable rope coil jig, and the jig is rotated to draw the rope through troughs containing contact cement to coat the rope with cement.

* * * * *